July 21, 1925. 1,546,863

E. C. OVERBECK

TRACTOR SWABBING MACHINE

Filed May 17, 1922 2 Sheets-Sheet 1

Inventor
Earl C. Overbeck
By Chas. J. Williaman
Attorney

July 21, 1925.

E. C. OVERBECK

TRACTOR SWABBING MACHINE

Filed May 17, 1922

Inventor
Earl C. Overbeck
by
Chas. J. Williamson
Attorney

Patented July 21, 1925.

1,546,863

UNITED STATES PATENT OFFICE.

EARL C. OVERBECK, OF MEDINA, OHIO.

TRACTOR SWABBING MACHINE.

Application filed May 17, 1922. Serial No. 561,696.

*To all whom it may concern:*

Be it known that I, EARL C. OVERBECK, residing at Medina, county of Medina, and State of Ohio, a citizen of the United States, have invented certain new and useful Improvements in Tractor Swabbing Machines, of which the following is a specification.

The object of my invention is to provide a machine having an engine for propelling itself and which has an equipment by which the propelling engine may be used when the machine is at a standstill for such operations as swabbing or bailing water from gas wells, this particular operation involving employment of a wire line which is lowered into the well and drawn out therefrom, and a reel upon which the wire line is wound and from which it may be unwound, and in particular my object is to provide a machine in which to as large an extent as possible, standard parts may be employed or utilized. To this end, my invention consists in the machine constructed as described by or included within the terms or scope of the appended claims.

Figure 1:
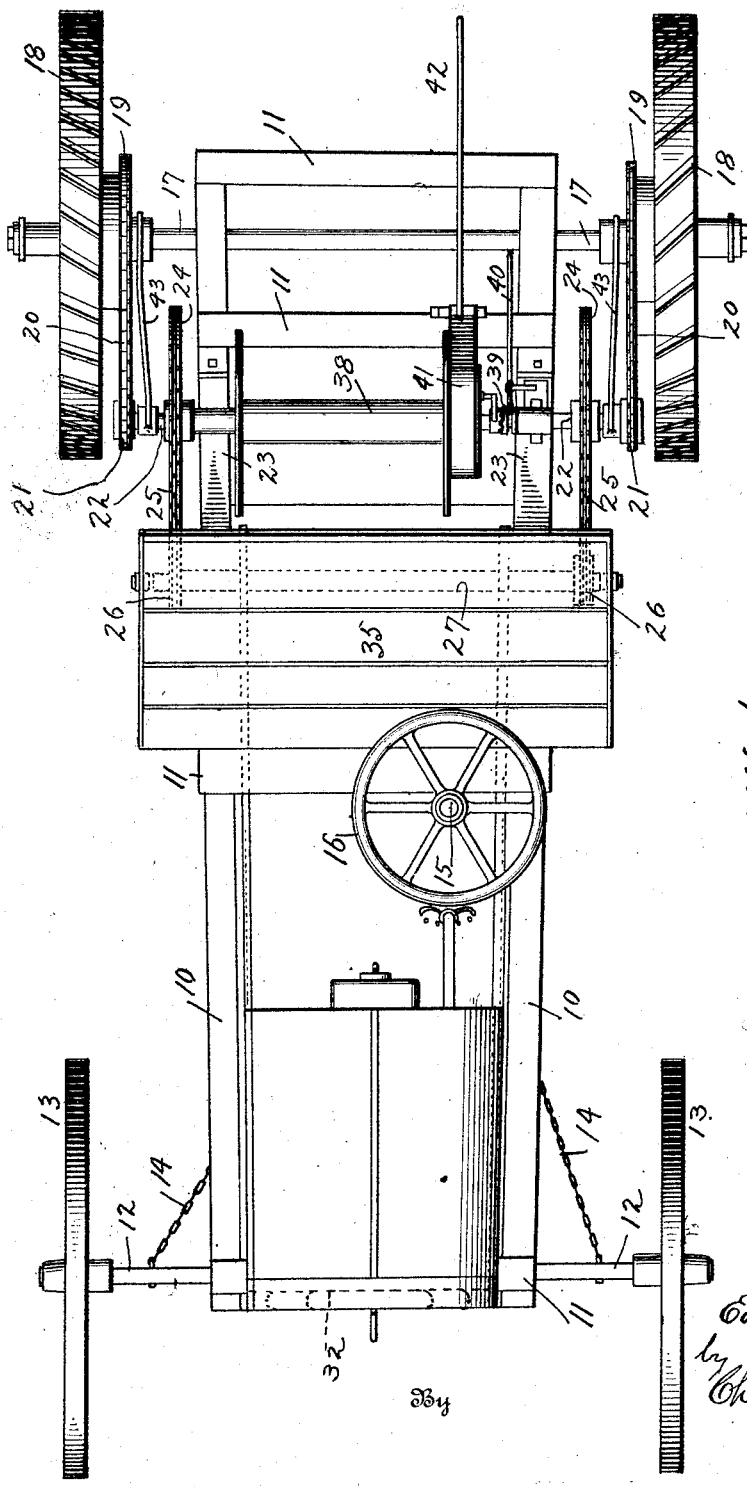
Fig. 1 is a top plan view of a machine embodying my invention.
Figure 2:
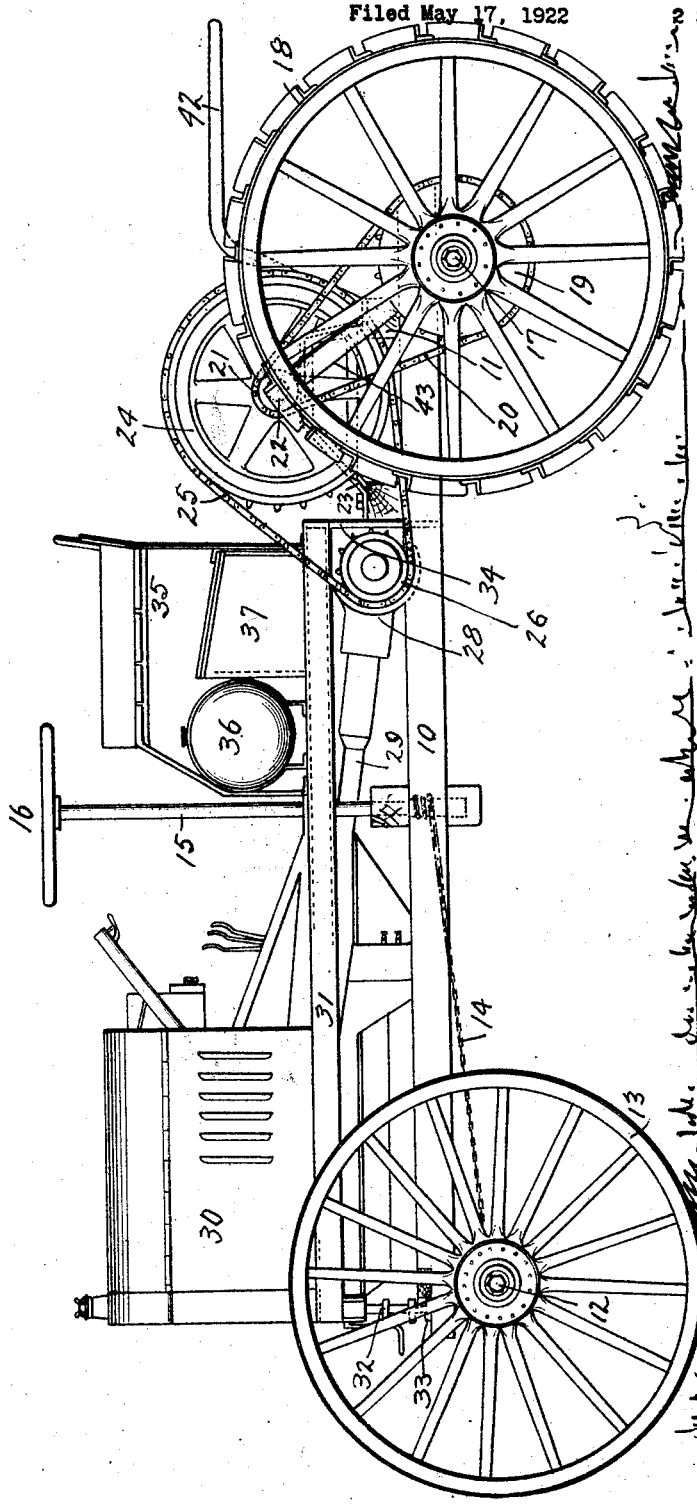
Fig. 2 is a side elevation thereof.

The main frame of the machine shown in the drawings comprises a pair of longitudinally extending beams, 10, of wood which form the frame sides, and several cross beams, 11, also of wood, which connect the side beams at suitable points lengthwise of the frame. The main frame at the front rests upon a centrally pivoted front axle, 12, upon which are mounted a pair of light wagon wheels, 13, the axle near each wheel having attached to it the respective ends of a chain, 14, which is carried about a vertical steering post, 15, having a hand wheel, 16, at its top by which steering is done. The main frame at the rear rests upon a rear axle 17 upon which two tractor wheels, 18, are mounted preferably by Timken bearing and upon the inner side of each rear wheel, 18, is a sprocket wheel, 19, which is connected by a chain, 20, with a sprocket pinion, 21, on a transverse shaft, 22, that is supported by standards, 23, which rest upon the top of the side beams of the main frame. Upon the shaft, 22, is a sprocket wheel, 24, which is connected by a sprocket chain, 25, with a sprocket pinion, 26, on a cross shaft, 27, which is mounted in bearings on the side beams of the main frame, which by a differential, 28, is geared to and receives motion from the transmission shaft, 29, of the gas engine, 30, mounted upon a chassis, 31, which at the front rests upon a semi-elliptical spring, 32, that at its ends is attached to a cross bar, 33, resting upon the front end of the side beams of the main frame. At its rear end the chassis is supported by standards, 34, on the main frame. The engine, chassis, and spring are preferably Ford parts, the chassis being cut off at the back end so that it is less in length than the main frame, and a seat, 35, is provided that rests upon the chassis, and beneath the seat are mounted gasoline tank, 36, and tool box, 37.

Upon the shaft, 22, which is located between the rear of the chassis and the rear axle is mounted a reel or drum, 38, which is loose or free from the shaft but to which it may be clutched by a clutch, 39, having an operating lever, 40, which extends to the rear, the reel being clutched to the shaft when it is desired to wind thereon the swabbing wire line, and, of course, being unclutched when the tractor is being propelled from place to place as from one farm to another to change its scene of operation. When the reel is clutched to the shaft, the driving connection between the shaft, 22, and the rear axle is disconnected as by the disconnection of adjacent links of the two sprocket chains, 20, which involves merely the removal of a cotter pin and the withdrawal of the pivot bolt or pin that connects adjoining links.

To control the rotation of the reel, 38, at one end it has a friction brake, 41, which may be operated by a rearwardly extending handle, 42.

The rear wheels are preferably provided with brake drums.

The outer ends of the shaft, 22, are preferably supported from the rear axle by arms, 43, each reaching from the rear axle to a bearing, 44, on the shaft.

What I claim is:

1. A machine for the purpose described comprising a main frame, an engine supporting chassis mounted thereon, a driver's seat on said chassis, the rear end of the chassis being forward of the rear end of the main frame, front and rear axles, a shaft geared to the engine and to the rear wheels and located between the rear end of the chassis and the rear end of the main frame, and a drum loosely mounted on said shaft and adapted to be connected with and disconnected therefrom.

2. A machine for the purpose described comprising a main frame, an engine supporting chassis mounted thereon, a driver's seat on said chassis, the rear end of the chassis being forward of the rear end of the main frame, front and rear axles, a shaft geared to the engine and to the rear wheels and located between the rear end of the chassis and the rear end of the main frame, and a drum loosely mounted on said shaft, and adapted to be connected with and disconnected therefrom, the driving connection between said shaft and said rear wheels being separable.

3. A machine for the purpose described comprising a main horizontally extending frame, axles at the front and rear of said frame beneath the same, the front axle being a guide axle, wheels on both axles, a supporting chassis mounted upon and situated above said main frame there being a substantial space between the rear end of said chassis and the rear end of the main frame, a shaft geared to the engine and situated beneath the chassis at the rear end and above the main frame, a second shaft mounted in bearings upon the main frame in rear of the chassis, a gear connection between said shafts, a gear connection between the second shaft and the rear wheels, a drum loosely mounted upon said second shaft and mounted to be connected with and disconnected therefrom, and a driver's seat mounted upon said chassis at the rear end thereof.

In testimony whereof I hereunto affix my signature.

EARL C. OVERBECK.